US009092896B2

(12) United States Patent
Scavezze et al.

(10) Patent No.: US 9,092,896 B2
(45) Date of Patent: Jul. 28, 2015

(54) AUGMENTED REALITY DISPLAY OF SCENE BEHIND SURFACE

(75) Inventors: Mike Scavezze, Bellevue, WA (US);
Jason Scott, Kirkland, WA (US);
Jonathan Steed, Redmond, WA (US);
Ian McIntyre, Redmond, WA (US);
Aaron Krauss, Snoqualmine, WA (US);
Daniel McCulloch, Kirkland, WA (US);
Stephen Latta, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 392 days.

(21) Appl. No.: 13/569,013

(22) Filed: Aug. 7, 2012

(65) Prior Publication Data

US 2014/0043433 A1    Feb. 13, 2014

(51) Int. Cl.
*G06T 19/00*    (2011.01)
(52) U.S. Cl.
CPC ............................... *G06T 19/006* (2013.01)
(58) Field of Classification Search
CPC ..................................................... G06T 19/006
See application file for complete search history.

(56) References Cited

U.S. PATENT DOCUMENTS

| | | |
|---|---|---|
| 5,850,352 A | 12/1998 | Moezzi et al. |
| 6,842,175 B1 | 1/2005 | Schmalstieg et al. |
| 7,002,551 B2 | 2/2006 | Azuma et al. |
| 2006/0176242 A1 | 8/2006 | Jaramaz et al. |
| 2011/0153215 A1* | 6/2011 | Yoon et al. .................. 702/5 |
| 2011/0287811 A1 | 11/2011 | Mattila et al. |

FOREIGN PATENT DOCUMENTS

| | | |
|---|---|---|
| WO | 2013/043288 A2 | 3/2013 |
| WO | 2014/025699 A2 | 2/2014 |

OTHER PUBLICATIONS

Denis Kalkofen, Erick Mendez, and Dieter Schmalstieg, Interactive Focus and Context Visualization for Augmented Reality, 2007, In Proceedings of the 2007 6th IEEE and ACM International Symposium on Mixed and Augmented Reality, ISMAR '07, IEEE Computer Society, pp. 1-10.*
Bane, et al., "Interactive Tools for Virtual X-Ray Vision in Mobile Augmented Reality", Retrieved at <<http://www.cs.ucsb.edu/~holl/pubs/bane-2004-ismar.pdf>>, Proceedings of IEEE/ACM International Symposium on Mixed and Augmented Reality, Nov. 2, 2004, pp. 231-239.

(Continued)

*Primary Examiner* — Jeffery A Brier
(74) *Attorney, Agent, or Firm* — Judy Yee; Micky Minhas

(57) ABSTRACT

Embodiments are disclosed that relate to augmenting an appearance of a surface via a see-through display device. For example, one disclosed embodiment provides, on a computing device comprising a see-through display device, a method of augmenting an appearance of a surface. The method includes acquiring, via an outward-facing image sensor, image data of a first scene viewable through the display. The method further includes recognizing a surface viewable through the display based on the image data and, in response to recognizing the surface, acquiring a representation of a second scene comprising one or more of a scene located physically behind the surface viewable through the display and a scene located behind a surface contextually related to the surface viewable through the display. The method further includes displaying the representation via the see-through display.

15 Claims, 5 Drawing Sheets

(56) References Cited

OTHER PUBLICATIONS

Avery, et al., "Improving Spatial Perception for Augmented Reality X-Ray Vision", Retrieved at <<http://www.magicvisionlab.com/pub/avery_ieeevr09/paper.pdf>>, Proceedings of IEEE Virtual Reality Conference, Mar. 14, 2009, pp. 79-82.

Giles, Jim, "Augmented Reality System Lets You See Through Walls", Retrieved at <<http://www.newscientist.com/article/dn18036-augmented-reality-system-lets-you-see-through-walls.html>>, Oct. 23, 2009, pp. 6.

"X-ray Vision gives Volkswagen a Virtual Training Advantage", Retrieved at <<http://www.volkswagen.co.uk/volkswagen-world/news/273>>, Mar. 15, 2012, p. 1.

Avery, Benjamin, "X-Ray Vision for Mobile Outdoor Augmented Reality", Research Thesis for the Degree of Doctor of Philosophy, University of South Australia, http://ura.unisa.edu.au/R/?func=dbin-jump-full&object_id=56780, May 31, 2009, 190 pages.

Beckler, Matthew et al., "Computer Vision for Augmenting Reality", http://www.mbeckler.org/coursework/2007-2008/vision_augmenting_reality.pdf, May 8, 2008, 16 pages.

Dey, Arindam et al., "An Evaluation of Augmented Reality X-Ray Vision for Outdoor Navigation", The 21st International Conference on Artificial Reality and Telexistence, Nov. 2011, 6 pages.

"Nokia N900 User Guide", Nokia, http://nds1.nokia.com/phones/files/guides/Nokia_N900_UG_en.pdf, Available as early as Nov. 11, 2009, 22 pages.

ISA European Patent Office, Invitation to Pay Additional Fees and, Where Applicable, Protest Fee for International Patent Application No. PCT/US2013/053636, Feb. 14, 2014, 10 pages.

ISA European Patent Office, International Search Report and Written Opinion for Patent Application No. PCT/US2013/053636, Apr. 24, 2014, 19 pages.

"Partial Search Report Issued in European Patent Application No. 13198223.3", Mailed Date: May 30, 2014, Filed Date: Dec. 18, 2013, 7 Pages.

Carmigniani, et al., "Chapter 1: Augmented Reality: An Overview", In Book: Handbook of Augmented Reality, A Springer Publication, Sep. 18, 2011, pp. 3-46.

Jackson, et al., "Chapter 19: Survey of Use Cases for Mobile Augmented Reality Browsers", In Book: Handbook of Augmented Reality, A Springer Publication, Sep. 10, 2011, pp. 409-431.

European Patent Office, Search Report Issued in European Patent Application No. 13198223.3, Germany, Oct. 21, 2014, 11 Pages.

* cited by examiner

US 9,092,896 B2

AUGMENTED REALITY DISPLAY OF SCENE BEHIND SURFACE

BACKGROUND

Surfaces, such as walls and doors, may obscure a scene from view. In order to view the scene, a person may need to open, or otherwise manipulate, the surface while in close physical proximity to the surface. However, such manipulation may not be possible or desirable in certain situations, such as when the surface is out of reach.

SUMMARY

Embodiments are disclosed that relate to augmenting an appearance of a surface via a see-through display device. For example, one disclosed embodiment provides, on a computing device comprising a see-through display device, a method of augmenting an appearance of a surface. The method comprises acquiring, via an outward-facing image sensor, image data of a first scene viewable through the display. The method further comprises recognizing a surface viewable through the display based on the image data and, in response to recognizing the surface, acquiring a representation of a second scene comprising one or more of a scene located physically behind the surface viewable through the display and a scene located behind a surface contextually related to the surface viewable through the display. The method further comprises displaying the representation via the see-through display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
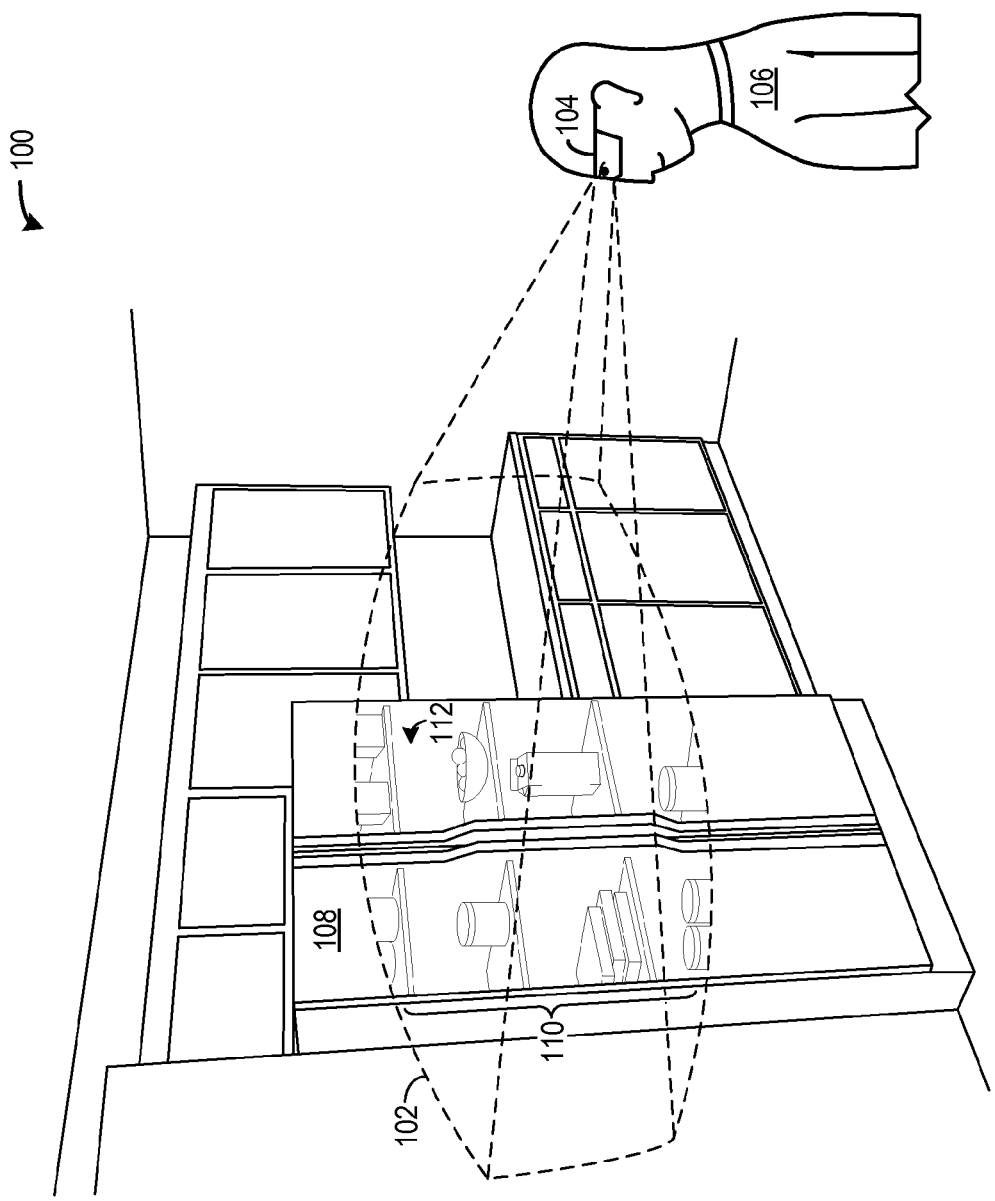
FIG. 1 illustrates an example use environment for an embodiment of a see-through display device, and also illustrates an embodiment of an augmentation of a view of a scene by the see-through display device.

As mentioned above, various surfaces may obscure a person's view of scenes located behind the surfaces. In some instances, it may be advantageous for the person to have the ability to view what is located behind the surface without gaining an actual, physical view behind the surface. For example, in the case of a user-manipulable surface such as a refrigerator door, manipulating the surface to gain a view behind the surface may allow cold air to escape. Likewise, it may be desirable for the sake of convenience to view behind a surface when not in physical proximity to the surface, such as when a person is sitting on a sofa across the room from the surface, or is in a different location from the surface.

Accordingly, embodiments are disclosed that relate to providing a visual representation of an obscured scene, for example, via displaying representation of the obscured scene in spatial registration with an obscuring surface or contextually related surface. In this way, a user may be able to visually interpret an obscured scene even if the user has not previously viewed the obscured scene and/or is not in spatial proximity to the obscured scene.

Prior to discussing these embodiments in detail, a non-limiting use scenario is described with reference to FIG. 1, which illustrates an example environment 100 in the form of a kitchen. The kitchen comprises a scene 102 viewable through see-through display device 104 worn by user 106. It will be appreciated that, in some embodiments, the scene 102 viewable through the see-through display may be substantially coextensive with the user's field of vision, while in other embodiments the scene viewable through the see-through display may occupy a portion of the user's field of vision.

As will be described in greater detail below, see-through display device 104 may comprise one or more outwardly facing image sensors (e.g., two-dimensional cameras and/or depth cameras) configured to acquire image data (e.g. color/grayscale images, depth images/point cloud data, etc.) representing environment 100 as the user navigates the environment. This image data may be used to obtain information regarding the layout of the environment (e.g., three-dimensional surface map, etc.) and of objects and surfaces contained therein.

The image data acquired via the outwardly facing image sensors may be used to recognize a user's location and orientation within the room. For example, one or more feature points in the room may be recognized by comparison to one or more previously-acquired images to determine the orientation and/or location of see-through display device 104 in the room.

The image data may be further used to recognize a surface, such as surface 108 (e.g., refrigerator door), that obscures another scene. Recognition of a surface may comprise, for example, detecting an opening and/or closing of the surface via the image data, detecting a shape of a door or such feature in the image data, etc. As another example, see-through display device 104 may determine the existence of image data for a scene located behind a detected surface, and may therefore recognize the surface as obscuring a scene behind the surface without directly detecting an opening/closing motion of a door, without classifying the appearance of the object comprising the surface, etc. Further, in some embodiments, see-through display device 104 may be configured to determine a context of scene 102 (e.g., refrigerator, living room, office, closet, etc.) and/or of a surface (e.g., refrigerator door, cabinet door, wall, etc.) viewable through the display device. Such contexts may be usable, for example, to programmatically determine whether to display image data of a scene behind the surface (e.g. based upon one or more user preferences). As non-limiting examples, a user may desire to view image data for scenes obscured by a door, for scenes located within their home, for interior refrigerator scenes, and/or for scenes comprising any other suitable context. Accordingly, upon recognizing one or more scenes comprising such contexts, representations of said scenes may be programmatically displayed. Such contexts may be further usable, for example, to determine whether to display image data of a scene behind the surface based upon privacy preferences, and, if such display is permissible, to determine which data to display (e.g. what surface "depth" in instances where one recognized surface is located behind another recognized surface, whether to display a most recent or older image of a scene, etc.). Therefore, such contexts may allow for scene-based and/or surface-based granularity regarding the sharing, selection, and display of various scenes.

See-through display device 104 is further configured to augment the appearance of surface 108 by displaying representation 110 (e.g., image data) of scene 112 (e.g., refrigerator interior) located physically behind surface 108 as an "overlay" on top of surface 108 (i.e., refrigerator door). As will be described in greater detail below, such augmentation may be triggered via any suitable mechanism, including, but not limited to, user command and/or surface recognition by the display device. As another example, in some embodiments, see-through display device 104 may be configured to determine a direction of a gaze of user 106 (e.g., via one or more imaging sensors imaging a position of one or both of the user's eyes), and representation 110 may be triggered based upon the user's gaze at surface 108.

Representation 110 of scene 112 may comprise previously-collected image data. For example, the representation may comprise image data that previously collected by see-through display device 104 during a previous interaction of user 106 with the object incorporating surface 108. As another example, the displayed representation may comprise image data that was previously-collected by a different device (e.g., see-through display device of another user, smartphone, IP camera, etc.). Accordingly, in some embodiments, see-through display device 104 may be configured to share data with, and retrieve data from, multiple devices in order to provide a most recently-acquired image. Further, in yet other embodiments, a user may choose to view an older representation than a most-recently acquired image, as explained in more detail below.

It will be appreciated that the displayed representation of the obscured scene may comprise information generated from the image data instead of, or in addition to, the image data itself. For example, in some embodiments, the representation may comprise a generated model (e.g. generated from point cloud data acquired via a depth camera) and/or generated textual description of scene 112. In some embodiments, a viewed angle/orientation of such a generated model may be varied by the user.

Although representation 110 of scene 112 is illustrated as being in spatial registration and coextensive with the portion of surface 108 viewable through the see-through display, it will be appreciated that representation 110 may be displayed in any other suitable manner, and may be displayed via any other suitable device than a see-through display device. For example, in some embodiments, augmentation of scene 102 may be provided via a mobile computing device that does not include a see-through display, as mentioned above. In such an embodiment, a scene may be imaged via an image sensor of a mobile phone, tablet computer, or other mobile device, and a representation of scene 102 (e.g., a "live feed" from image sensor) may be displayed in conjunction with representation 110, for example, as an overlay over surface 108.

Figure 2:
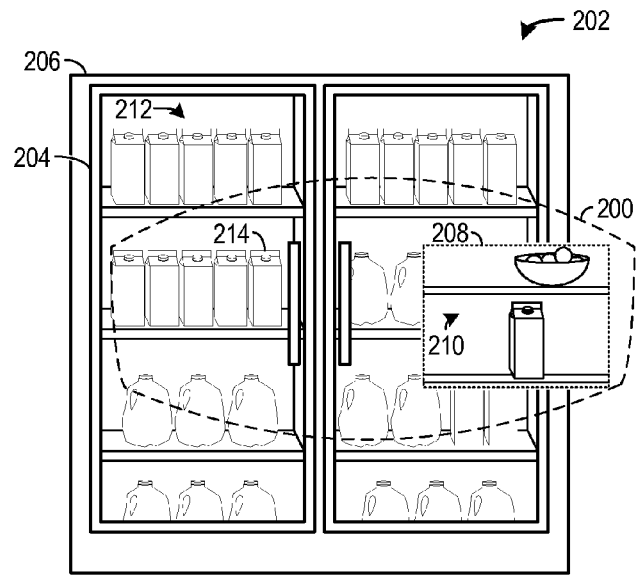
FIGS. 2 and 3 illustrates other embodiments of augmentations of a view of a scene by the see-through display device of FIG. 1.

As yet another example, FIG. 2 illustrates an example embodiment of scene 200 within environment 202 as viewed through a see-through display device (e.g., see-through display device 104 of FIG. 1). As illustrated, environment 202 is shown in the form of a grocery store and comprises surface 204 (e.g., see-through door) of object 206 in the form of a refrigerated display case.

The see-through display device may be configured to identify that object 206 is a refrigerated display case, and further to determine that object 206 is contextually related to another object, such as the refrigerator comprising surface 108 of FIG. 1. Such a determination may be made based upon analysis of a shape and/or appearance of the object against recognized shapes (e.g. via classification function(s)), based upon a shape and/or appearance of contents of the object (e.g. milk cartons or in any other suitable manner. Further, additional contextual information may be taken into account when identifying an object. For example, locational information (e.g. that the user is in a grocery store) may be used to help identify object 206.

In response to identifying object 206, the see-through display device display an image augmenting the appearance of surface 204, wherein the image comprises representation 208 of contextually-related scene 210 (refrigerator interior scene 112 of FIG. 1 in this example). In this manner, the contextual clue of the refrigerated display case in a grocery store, and/or the contents of the refrigerated display case (e.g. milk cartons), may trigger the display of a recent view of the contents of the user's home refrigerator. This may allow the user to view the recent contents of the home refrigerator and determine whether any items are needed from the store.

The contextually-related scene may be displayed in any suitable manner. For example, although illustrated as being displayed as substantially opaque, it will be appreciated that representation 208 of scene 210 may comprise a lesser opacity such that the contents of the refrigerated display care are viewable through the representation.

It will be appreciated that, for a detected surface, there may exist any number and combination of representations of scenes located physically behind the surface and/or that are contextually-related to the surface. Therefore, various mechanisms may be utilized to determine which scene, and particular representation thereof, to display to a user. For example, in the case where multiple images of a scene located physically behind the surface (or behind a surface contextually related to the surface) are stored, a most recent representation may be presented as a default in some embodiments, and a user may request another representation (e.g. an older representation). In other embodiments, any other default representation may be presented.

Where display of a different scene is desired, where one or more surfaces are not recognized (e.g., due to lack of network connectivity, low light scenarios, etc.), and/or according to any other suitable mechanism, a list of scenes for which information is available may be displayed. The list may be configured to be manually browsed through by a user, or may be presented in slideshow or other automatically progressing manner. Further, such a list may be presented via text, via images (e.g. thumbnail images), and/or via any other suitable mechanism or combination of mechanisms. It will be appreciated that in some embodiments, two or more representations of one or more scenes may be selected for simultaneous or sequential viewing (e.g. to compare a view of a scene taken at two different times).

Figure 3:
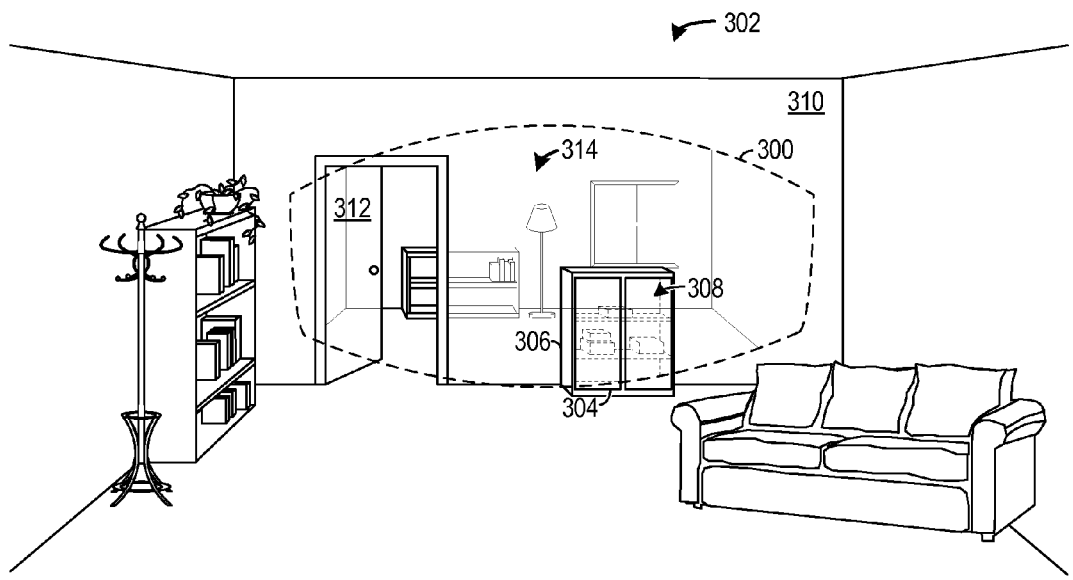

Further, in some embodiments, the see-through display device may be configured to allow a user to view behind multiple surfaces. For example, FIG. 3 illustrates a plurality of scenes representing various "depths" within an environment. More specifically, FIG. 3 illustrates scene 300 viewable through a see-through display device (e.g., see-through display device 104 of FIG. 1) within environment 302, wherein scene 300 comprises surface 304 (e.g., a door) of object 306 (e.g., a cabinet) obscuring scene 308 (e.g., a cabinet interior). Further surfaces 310 (e.g., a wall) and 312 (e.g., door) illustrated as at least partially obscuring scene 314 (e.g., another room).

Representations of scene 308 and/or scene 314 may be displayed to a user according to any suitable mechanism or combination of mechanisms. For example, the see-through display device may comprise one or more preferences, which may be user-adjustable, such that the device that may be configured to display scenes that are obscured by doors (e.g., scene 308), but not scenes obscured by walls (e.g., scene 314). The see-through display device also may comprise one or more preferences regarding a "surface depth level" to be displayed. For example, at a depth level of "1", scene 308 (located behind one surface) may be displayed, whereas scene 314 (located behind two surfaces) may not. As another example, at a depth level of "2", scene 308 and scene 314 may be displayed. Accordingly, where the see-through display device allows a user to view scenes of different depths, the scenes may be displayed separately or together.

Walls (e.g., surface 310) between scenes within a use environment may be recognized, for example, by recognizing a thickness (e.g., via image data acquired of an edge of the wall with one or more depth cameras), by determining an availability of information for scenes on both sides of the wall (e.g., scene 300 and scene 314), and/or in any other suitable manner. Similarly, doors (e.g., surface 312) may be recognized as being present only some of the time (e.g., in temporally-separated instances of the image data), by movement recognition, by appearance and/or contextual information (e.g. rectangular and extending upward from the floor), features (e.g. door knob), location (e.g. on a larger, flat expanse), and/or in any other suitable manner.

As mentioned above, the representation of an obscured scene (e.g., scene 314) displayed to a user may comprise previously-collected image data. Such previously-collected image data may comprise data collected by the user and/or by another user. Further, the previously-collected image data may represent a most-recent image stored for the obscured scene, or one or more older instances of image data. Additionally, in some embodiments, the image data may comprise real-time image data currently being acquired by a different computing device. As a more specific example, the representation of scene 314 may comprise image data from another user (not illustrated) currently viewing scene 314. In this way, the user may be able to view a representation of scene 314 that updates in real time based on the image data from the other user.

Such a configuration may provide the potential benefit of allowing a user to find another user by viewing the representation of the scene of the other user. For example, finding a route through a mall or office building based on GPS coordinates may be confusing, since the coordinates themselves are not meaningful and the user may not have ready access to a map. Further, walls or other obstructions may prevent a direct route from the user's position to the destination. Accordingly, a user may be able to view the current scene of the destination (e.g., via a friend's see-through display device) to navigate to the friend by recognizing landmarks near the destination (e.g., directly or via computer-vision techniques).

In embodiments in which image data is shared between users, it will be understood that any suitable privacy and/or permission mechanisms, and/or combinations thereof, may be used to control cross-user access to such image data. For example, in some embodiments, a list of trusted other users may be maintained by a user that defines access to the user's image data. In other embodiments, access may also be limited based upon the location of surfaces. For example, a user may wish to restrict access to image data acquired in private spaces (e.g., home or workplace), but may wish to share image data acquired in public spaces (e.g., shopping mall). In yet other embodiments, additional granularity may be provided by defining various levels of trust for different users. For example, family members may be provided access to image data acquired in the user's home, while other non-family users may be restricted from accessing such image data. It will be understood that these privacy/permission scenarios are presented for the purpose of example, and are not intended to be limiting in any manner.

Figure 4:
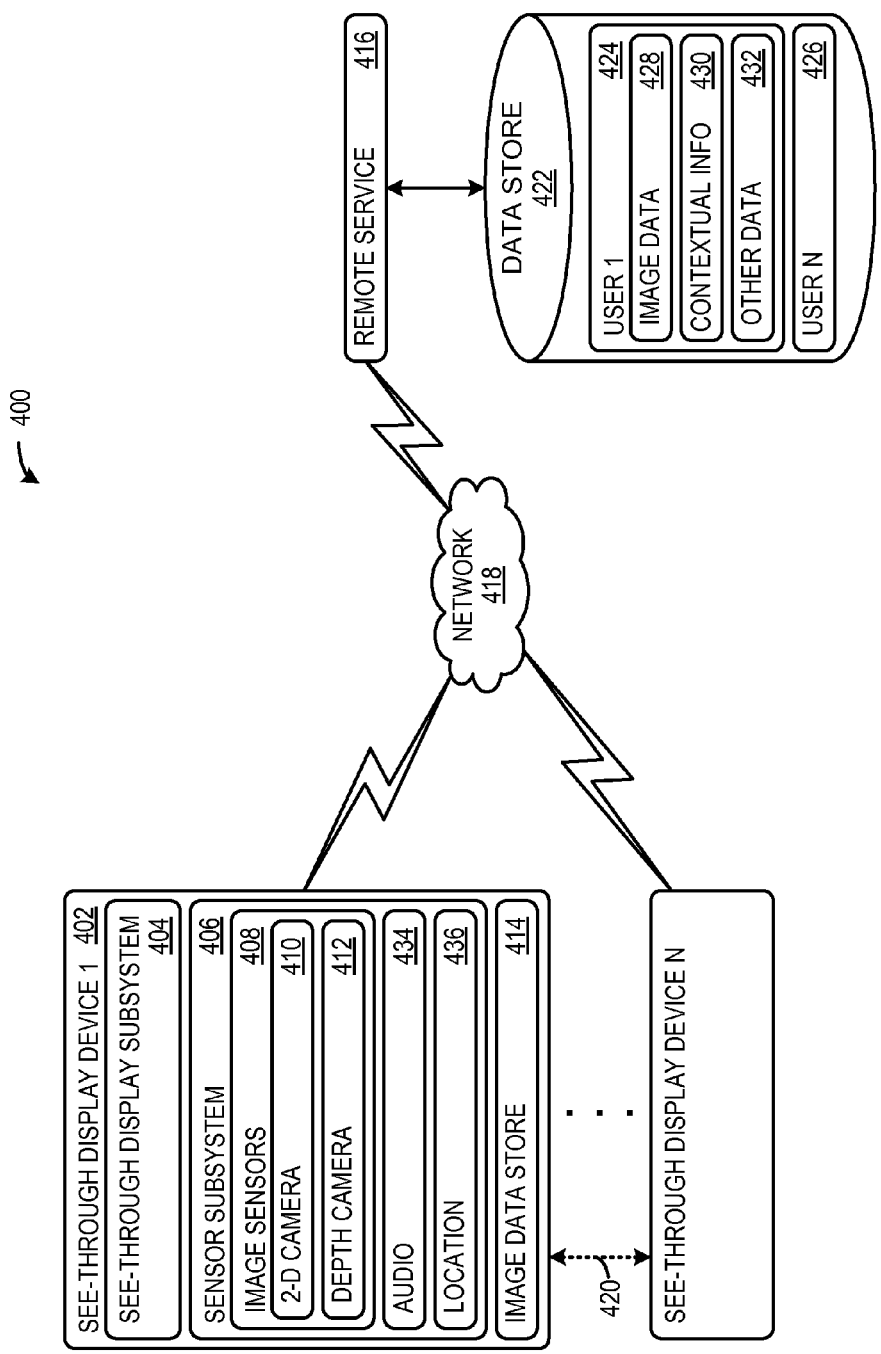
FIG. 4 schematically shows a block diagram illustrating an embodiment of a use environment for a see-through display device.

FIG. 4 schematically shows a block diagram of an embodiment of a use environment 400 for a see-through display device configured to augment a view of a surface with a view of a scene obscured by the surface. Use environment 400 comprises a plurality of see-through display devices, illustrated as see-through display device 1 402 and see-through display device N. Each see-through display device comprises see-through display subsystem 404 configured to display an image on one or more see-through display screens. The see-through display devices may take any suitable form, including, but not limited to, head-mounted near-eye displays in the form of eyeglasses, visors, etc.

Each see-through display device 402 may further comprise sensor subsystem 406 including any suitable sensors. For example, the sensor subsystem 406 may comprise one or more image sensors 408, such as, for example, one or more color or grayscale two-dimensional cameras 410 and/or one or more depth cameras 412. Depth cameras 412 may be configured to measure depth using any suitable technique, including, but not limited to, time-of-flight, structured light, and/or stereo imaging. The image sensors 408 may comprise one or more outward-facing cameras configured to acquire image data of a background scene (e.g., scene 102 of FIG. 1) viewable through the see-through display device. Further, in some embodiments, the user device may include one or more illumination devices (e.g., IR LEDs, flash, structured light emitters, etc.) to aid with image acquisition. Such illumination devices may be activated in response to one or more environmental inputs (e.g., low light detection) and/or one or more user inputs (e.g., voice command). In some embodiments, the image sensors may further comprise one or more inward-facing image sensors configured to detect eye position and movement to enable gaze tracking (e.g., to allow for visual operation of a menu system, recognize eye focus towards surfaces, etc.).

The image data received from image sensors 408 may be stored in image data store 414 (e.g., FLASH, EEPROM, etc.), and may be usable by see-through display device 402 to identify the one or more surfaces present in a given environment. Further, each see-through display device 402 may be configured to interact with remote service 416 and/or one or more other see-through display devices via network 418, such as a computer network and/or a wireless telephone network. Yet further, in some embodiments, interaction between see-through display devices may be provided via direct link 420 (e.g., near-field communication) instead of, or in addition to, via network 418.

Remote service 416 may be configured to communicate with a plurality of see-through display devices to receive data from and send data to the see-through display devices. Further, in some embodiments, at least part of the above-described functionality may be provided by remote service 416. As a non-limiting example, see-through display device 402 may be configured to acquire image data and display the augmented image, whereas the remaining functionality (e.g., surface identification, related scene acquisition, image augmentation, etc.) may be performed by the remote service.

Remote service 416 may be communicatively coupled to data store 422, which is illustrated as storing information for a plurality of users represented by user 1 424 and user N 426. It will be appreciated that any suitable data may be stored, including, but not limited to, image data 428 (e.g. image data received from image sensors 408 and/or information computed therefrom) and contextual information 430. Contextual information 430 may include, but is not limited to, the contexts of one or more surfaces and/or one or more scenes represented by image data 428. Such information may be used, for example, by see-through display device 402 to identify and acquire a representation of a scene that is contextually-related to a surface viewable through the see-through display device (e.g., scene 112 related to surface 108 of FIG. 1).

Although information within data store 422, is illustrated as being organized on a user-by-user basis, it will be understood that the information may be organized and stored in any suitable manner. For example, the image data and/or surface information may be arranged by location (e.g., via GPS coordinates, via recognized location classifications such as "home" or "work"), by category (e.g., "food"), etc.

Contextual information 430 may be determined and assigned to image data and/or objects in the image data in any suitable manner. In some embodiments, contextual information 430 may be at least partially user-defined. In one specific example, referring to FIG. 1, see-through display device 104 may detect user gaze towards surface 108, and user 106 may provide a voice command (e.g., "Label surface 'Refrigerator Door'") to enter contextual information 430 for surface 108. Similarly, see-through display device 104 may detect location within environment 100, and user 106 may provide a voice command (e.g., "Label scene 'Kitchen'") to enter contextual information 430 for environment 100.

Likewise, in some embodiments, contextual information 430 may be automatically determined by via see-through display device 402, via remote service 416, or via other device or service. For example, one or more classification functions may be used to classify objects imaged by the outward-facing image sensors, and labels may be applied based upon the results of the classification process(es), as well as the location of the object (home, office, etc.), and/or any other suitable contextual information. It will be understood that these scenarios are presented for the purpose of example, and are not intended to be limiting in any manner.

Data store 422 may further comprise other data 432 including, but not limited to, information regarding trusted other users with whom image data 428 and/or contextual information 430 may be shared. As mentioned above, access to image data 428 and/or contextual information 430 may be controlled according to any suitable granularity. For example, access may be denied to all other users based upon the location of surfaces (e.g., home vs. public space), denied to certain users based on one or more user-relationships (e.g., image data within home may be limited to family members), and/or otherwise controlled according to one or more static and/or user-adjustable preferences.

In this way, a user of device 402 may be able to access data that was previously collected by one or more different devices, such as a see-through display device or other image sensing device of a family member. As such, the image data and/or information computed therefrom that relates to various use environments may be shared and updated between the user devices. Thus, depending upon privacy preferences, a user may have access to information related to a given environment even if the user has not previously navigated the environment. Further, even if the user has previously navigated the environment but more recently updated information is available.

See-through display device 402 may further comprise one or more audio sensors 434, such as one or more microphones, which may be used as an input mechanism. See-through display device 402 may further comprise one or more location sensors 436 (e.g., GPS, RFID, proximity, etc.). In some embodiments, the location sensors may be configured to provide data for determining a location of the user device. Further, in some embodiments, information from one or more wireless communication devices array may be usable to determine location, for example, via detection of proximity to known wireless networks.

Figure 5:
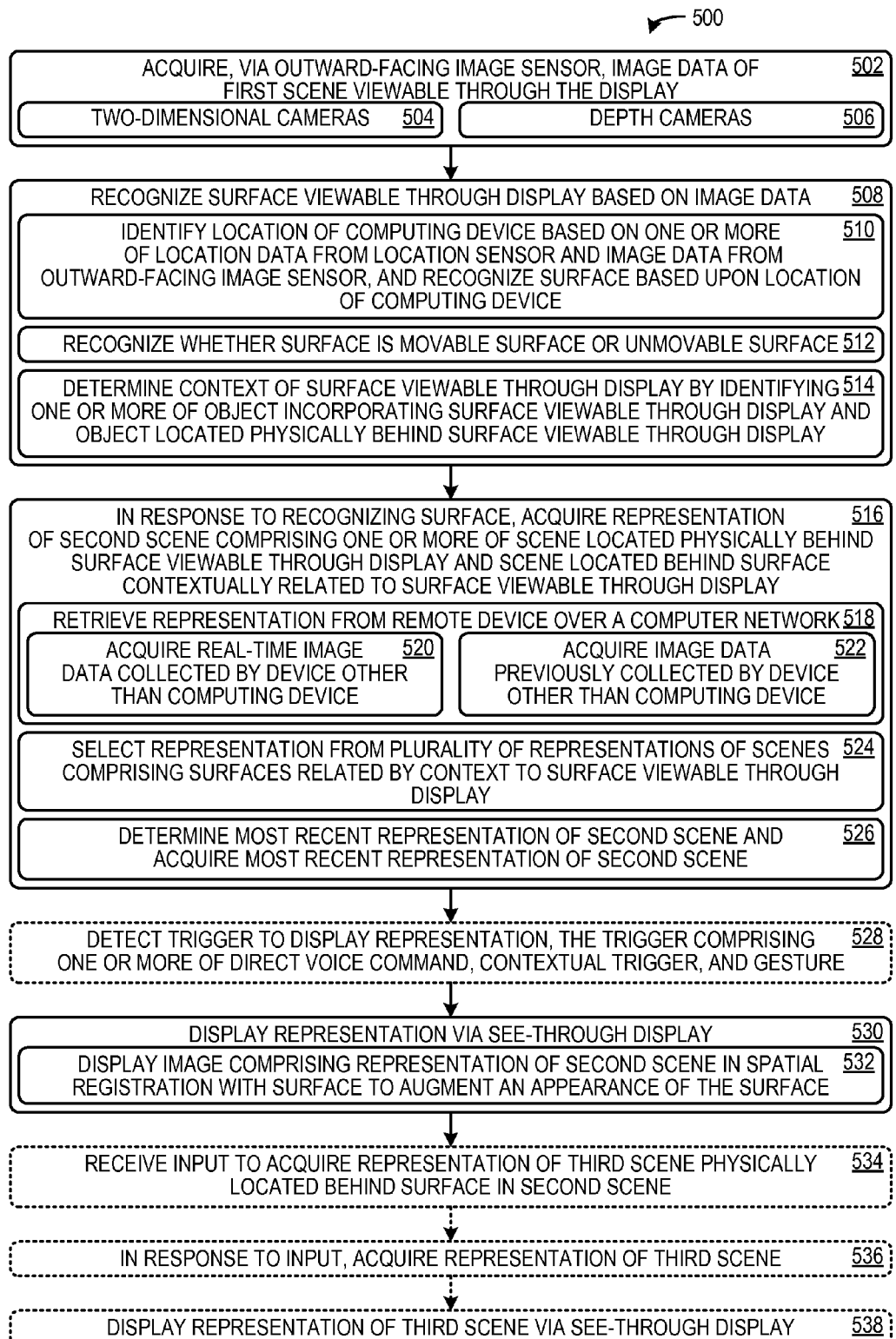
FIG. 5 shows a process flow depicting an embodiment of a method for augmenting a view of a scene.

Turning now to FIG. 5, a process flow depicting an embodiment of a method 500 for augmenting a view of a scene is shown. At 502, method 500 comprises acquiring, via the outward-facing image sensor, image data of a first scene viewable through the display. The image data may be acquired, for example, from one or more two-dimensional cameras 504 and/or one or more depth cameras 506.

At 508, method 500 further comprises recognizing a surface surface 108) viewable through the display based on the image data. In some embodiments, recognizing the surface may comprise identifying 510 a location of the computing device based on one or more of location data from a location sensor (e.g., location sensor 436) and the image data from the outward-facing image sensor, and recognizing the surface based upon such information.

Recognizing the surface may further comprise recognizing 512 whether the surface is a movable surface or an unmovable surface. For example, a door (e.g., surface 108) may be identifiable as a door by detecting motion of the surface via the image data. As another example, a surface may be identified as movable based on a comparison between two or more instances of image data (e.g., door open in one instance and closed in another), by the existence of one or more scenes obscured by the surface (e.g., based on previously-collected image data and/or location data), and/or in any other suitable manner.

Recognizing the surface may further comprise determining 514 a context of the surface viewable through the display (e.g., surface 204), for example, by identifying one or more of an object incorporating the surface viewable through the display (e.g., e.g. a refrigerated display in a grocery store) and an object located physically behind the surface viewable through the display (e.g., a carton of milk). As mentioned above, it will be appreciated that the context of the surface may be determined in any suitable manner.

At 516, method 500 further comprises, in response to recognizing the surface, acquiring a representation of a second scene comprising one or more of a scene located physically behind the surface viewable through the display and a scene located behind a surface contextually related to the surface viewable through the display. In some embodiments, the representation may be acquired from local storage (e.g., image data store 414). In other embodiments, acquiring the representation of the second scene may comprise retrieving the representation from a remote device (e.g., remote service 416) over a computer network and/or via direct link (e.g., direct link 420). Regardless of the storage location, acquiring the representation may comprise acquiring 520 real-time image data collected by a device other than the computing device. In other embodiments, acquiring the representation may comprise acquiring 522 image data previously collected by a device other than the computing device.

It will be appreciated that there may exist any number and/or configuration of representations of the second scene. For example, with reference to the example use environment 202 of FIG. 2, there may exist scenes other than scene 210

(e.g., user's home refrigerator) that are contextually-related to object 206 (e.g., refrigerated display case at supermarket), such as a friend's refrigerator, a refrigerated display case in another store, a pantry, and the like. Thus, acquiring the representation of the second scene may comprise selecting 524 the representation from a plurality of representations of scenes comprising surfaces related by context to the surface viewable through the display. Such a selection may be manually performed by the user (e.g. by browsing through a list) and/or may be programmatically determined.

It also will be further appreciated that for any given scene, there may exist a plurality of versions of image data corresponding to the scene (e.g., image data from yesterday, image data from a month ago, image data from a year ago, etc.). Accordingly, acquiring the representation of the second scene may further comprise determining 526 a most recent representation of the second scene and acquiring the most recent representation of the second scene as a default representation. In other situations, it may be desirable to view previous versions of the image data. For example, it may be desirable to view one or more previous versions of the image data to identify one or more objects previously present within the scene. As a more specific example, a user may refer to a previous version of the image data of the user's fridge to remember a type of beverage that the user enjoyed and would like to purchase again. It will be appreciated that the above scenarios are presented for the purpose of example, and are not intended to be limiting in any manner.

At 528, method 500 comprises detecting a trigger to display the representation. Any suitable trigger may be utilized. Examples include, but are not limited to, one or more of a direct voice command, a contextual trigger, a programmatically-generated trigger, and a gesture (via eye, arm, head, and/or other). A contextual trigger, as described above, may comprise a visually-determined context of the scene or an audio-based context of a conversation (e.g., determination of conversation involving food), among others.

A programmatically-generated trigger may be effected, for example, according to time, date, and/or previous state of the computing device. For example, in some embodiments, a user may enable the above-described augmentation mechanisms, and augmentation may be performed until said mechanisms are disabled. In other words, each surface viewable through the see-through display device may be recognized, and subsequently augmented, until a trigger requesting the disabling of such mechanisms is received. As another example, a user may specify one or more distinct surfaces (e.g., home refrigerator), one or more contexts (e.g., food-based surfaces), and or any other operating granularity, for which to provide augmentation until a trigger is received requesting otherwise.

In some embodiments, a trigger may be received from, and/or at least partially based upon information received from, a remote computing device (e.g., see-through display device of another user). In such embodiments, as with the "local" trigger discussed above, said trigger may be generated according to any suitable mechanism or combination of mechanisms. For example, as mentioned above, scene augmentation may allow a user to find another user by viewing the representation of the scene of the other user. Accordingly, in such scenarios, a trigger may be received from the computing device of the other user to provide such functionality. It will be appreciated that other triggers are possible without departing from the scope of the present disclosure.

At 530, method 500 further comprises displaying the representation via the see-through display. For example, in some embodiments, displaying the representation may comprise displaying 532 an image comprising a representation of the second scene in spatial registration with the surface to augment an appearance of the surface. In other embodiments (e.g., representation 208 of FIG. 2), representation may be displayed in any other suitable manner. It will be appreciated that the representation may comprise any suitable appearance and may comprise information (e.g., three-dimensional model, text-based information, etc.) other than, or in addition to, image data received from one or more image sensors.

As described above, it may be desirable to provide different "depths" of surface augmentation to a user of the display device. Accordingly, at 534, method 500 may further comprise receiving an input to acquire a representation of a third scene (e.g., scene 314) physically located behind a surface in the second scene (e.g., scene 308). At 536, method 500 may comprise, in response to the input, acquiring the representation of the third scene. Method 500 may further comprise, at 538, displaying the representation of the third scene via the see-through display. As with the representation of the second scene, it will be appreciated that the third scene may have any suitable configuration. For example, in some embodiments, the representation of the third scene may be displayed in spatial registration with the surface in the second scene, while, in other embodiments, the representation may be displayed in another location via the see-through display.

In some embodiments, the above described methods and processes may be tied to a computing system including one or more computers. In particular, the methods and processes described herein may be implemented as a computer application, computer service, computer API, computer library, and/or other computer program product.

Figure 6:
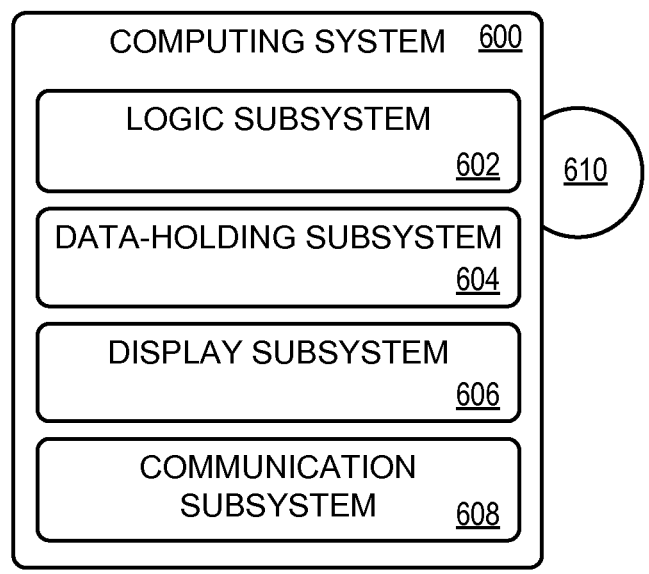
FIG. 6 schematically shows an example embodiment of a computing system.

FIG. 6 schematically shows a nonlimiting computing system 600 that may perform one or more of the above described methods and processes. See-through display device 104, see-through display device 402, and computing devices executing remote service 416 are non-limiting examples of computing system 600. Computing system 600 is shown in simplified form. It is to be understood that virtually any computer architecture may be used without departing from the scope of this disclosure. In different embodiments, computing system 600 may take the form of a mainframe computer, server computer, desktop computer, laptop computer, tablet computer, home entertainment computer, network computing device, mobile computing device, mobile communication device, wearable computer, gaming device, etc.

Computing system 600 includes a logic subsystem 602 and a data-holding subsystem 604. Computing system 600 may optionally include a display subsystem 606, communication subsystem 608, and/or other components not shown in FIG. 6. Computing system 600 may also optionally include user input devices such as keyboards, mice, game controllers, cameras, microphones, and/or touch screens, for example.

Logic subsystem 602 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 604 may include one or more physical, non-transitory, devices configured to hold data and/or instructions executable by the logic subsystem to implement the herein described methods and processes. When such methods and processes are implemented, the state of data-holding subsystem 604 may be transformed (e.g., to hold different data).

Data-holding subsystem 604 may include removable media and/or built-in devices. Data-holding subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 604 may include devices with one or more of the following characteristics: volatile, nonvolatile, dynamic, static, read/write, read-only, random access, sequential access, location addressable, file addressable, and content addressable. In some embodiments, logic subsystem 602 and data-holding subsystem 604 may be integrated into one or more common devices, such as an application specific integrated circuit or a system on a chip.

FIG. 6 also shows an aspect of the data-holding subsystem in the form of removable computer-readable storage media 610, which may be used to store and/or transfer data and/or instructions executable to implement the herein described methods and processes. Removable computer-readable storage media 610 may take the form of CDs, DVDs, HD-DVDs, Blu-Ray Discs, EEPROMs, and/or floppy disks, among others.

It is to be appreciated that data-holding subsystem 604 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

It is to be appreciated that a "service", as used herein, may be an application program executable across multiple user sessions and available to one or more system components, programs, and/or other services. In some implementations, a service may run on a server responsive to a request from a client.

When included, display subsystem 606 may be used to present a visual representation of data held by data-holding subsystem 604. As the herein described methods and processes change the data held by the data-holding subsystem, and thus transform the state of the data-holding subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or data-holding subsystem 604 in a shared enclosure, or such display devices may be peripheral display devices.

When included, communication subsystem 608 may be configured to communicatively couple computing system 600 with one or more other computing devices. Communication subsystem 608 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 600 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device comprising an outward-facing image sensor, a method comprising:
   acquiring, via the outward-facing image sensor, image data of a first scene;
   recognizing a surface based on the image data;
   in response to recognizing the surface, acquiring a representation of a second scene comprising one or more of a scene located physically behind the surface and a scene located behind a surface contextually related to the surface; and
   displaying the representation via a display device.

2. The method of claim 1, wherein recognizing the surface comprises identifying a location of the computing device based on one or more of location data from a location sensor and the image data from the outward-facing image sensor, and recognizing the surface based upon the location of the computing device.

3. The method of claim 1, wherein recognizing the surface comprises recognizing whether the surface is a movable surface or an unmovable surface, and displaying the representation only if the surface is a movable surface.

4. The method of claim 1, wherein the second scene is located behind the surface contextually related to the surface, and wherein recognizing the surface comprises determining a context of the surface by identifying one or more of an object incorporating the surface and an object located physically behind the surface.

5. The method of claim 4, wherein acquiring the representation of the second scene comprises selecting the representation from a plurality of representations of scenes comprising surfaces related by context to the surface.

6. The method of claim 1, wherein the second scene is physically located behind the surface, and wherein the method further comprises:
   receiving an input to acquire a representation of a third scene physically located behind a surface in the second scene;
   in response to the input, acquiring the representation of the third scene; and
   displaying the representation of the third scene via the display device.

7. The method of claim 1, wherein the display device is a see-through display-device, and wherein displaying the representation comprises displaying an image comprising a representation of the second scene in spatial registration with the surface to augment an appearance of the surface.

8. The method of claim 1, further comprising detecting a trigger to display the representation, the trigger comprising one or more of a direct voice command, a contextual trigger, a programmatically-generated trigger, and a gesture.

9. The method of claim 1, wherein acquiring the representation of the second scene comprises determining a most recent representation of the second scene and acquiring the most recent representation of the second scene.

10. A computing device, comprising:
a see-through display device;
an outward-facing image sensor configured to acquire image data of a scene viewable through the see-through display device;
a logic subsystem configured to execute instructions; and
a data-holding subsystem comprising instructions stored thereon that are executable by a logic subsystem to:
recognize a surface viewable through the display based on the image data,
in response to recognizing the surface, acquire a representation of one or more of a scene located physically behind the surface viewable through the display and a scene located behind a surface contextually related to the surface viewable through the display, and
display the representation via the see-through display.

11. The computing device of claim 10, wherein the image sensor comprises one or more two-dimensional cameras.

12. The computing device of claim 10, wherein the image sensor comprises one or more depth cameras.

13. The computing device of claim 10, wherein the instructions are executable to retrieve the representation from a remote device over a computer network.

14. The computing device of claim 13, wherein the instructions executable to acquire the representation comprise instructions executable to acquire image data previously collected by a device other than the computing device.

15. The computing device of claim 13, wherein the instructions executable to acquire the representation comprise instructions executable to acquire real-time image data collected by a device other than the computing device.

* * * * *